United States Patent
Chiba

(10) Patent No.: US 11,821,376 B1
(45) Date of Patent: Nov. 21, 2023

(54) UTILITY VEHICLE

(71) Applicant: KAWASAKI MOTORS, LTD., Hyogo (JP)

(72) Inventor: Junji Chiba, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 17/749,334

(22) Filed: May 20, 2022

(51) Int. Cl.
| | | |
|---|---|---|
| *F02D 31/00* | (2006.01) | |
| *F02D 41/02* | (2006.01) | |
| *B60Q 9/00* | (2006.01) | |
| *F16H 59/10* | (2006.01) | |

(52) U.S. Cl.
CPC ....... *F02D 31/002* (2013.01); *F02D 41/0225* (2013.01); *B60Q 9/00* (2013.01); *F02D 2200/101* (2013.01); *F02D 2200/1002* (2013.01); *F02D 2200/50* (2013.01); *F16H 59/10* (2013.01)

(58) Field of Classification Search
CPC .............. F02D 31/002; F02D 41/0225; F02D 2200/1002; F02D 2200/101; F02D 2200/50; F02D 13/04; F16H 59/10; F01L 13/065; F01L 13/06
See application file for complete search history.

(56) References Cited

U.S. PATENT DOCUMENTS

| | | | | | |
|---|---|---|---|---|---|
| 1,396,512 | A | * | 11/1921 | Fergusson | F16H 3/22 74/343 |
| 1,683,258 | A | * | 9/1928 | Passmore | 74/336.5 |
| 4,507,986 | A | * | 4/1985 | Okamura | B60W 10/06 477/43 |
| 6,149,540 | A | * | 11/2000 | Johnson | F16H 61/66227 474/46 |
| 6,652,414 | B1 | * | 11/2003 | Banks, III | F02B 37/24 60/602 |
| 8,382,620 | B2 | | 2/2013 | Morita | |
| 10,179,506 | B2 | * | 1/2019 | Yagyu | B60W 10/18 |
| 11,248,539 | B2 | * | 2/2022 | Lindell | F02P 11/02 |
| 11,376,955 | B2 | * | 7/2022 | Matsuda | B60K 17/3515 |
| 2004/0216717 | A1 | * | 11/2004 | Shibano | F02D 41/08 123/333 |

(Continued)

*Primary Examiner* — Carl C Staubach
(74) *Attorney, Agent, or Firm* — Wenderoth, Lind & Ponack, L.L.P.

(57) ABSTRACT

A utility vehicle includes: an engine; a drive wheel; a power transmission path between the engine and the drive wheel; a clutch that is provided in the power transmission path and configured to disconnect power transmission when an engine rotational speed is lower than an engage rotational speed; an engine rotational speed sensor configured to sense the engine rotational speed; and a controller configured to control an operation of the engine, the controller including an engine brake necessity determination circuitry configured to determine necessity of engine braking, and an engine rotational speed control circuitry configured to control the engine rotational speed, and when the engine brake necessity determination circuitry determines that engine braking is necessary, the engine rotational speed control circuitry is configured to perform automatic engine brake control that increases the engine rotational speed so as to be equal to or higher than the engage rotational speed.

14 Claims, 10 Drawing Sheets

(56) References Cited

U.S. PATENT DOCUMENTS

| | | | | |
|---|---|---|---|---|
| 2007/0266991 A1* | 11/2007 | Yoshioka | .............. | F02D 31/002 |
| | | | | 123/339.1 |
| 2008/0041336 A1* | 2/2008 | Gibson | ................ | F02D 41/123 |
| | | | | 123/322 |
| 2015/0191168 A1* | 7/2015 | Mitsuyasu | .............. | F02D 13/06 |
| | | | | 701/54 |
| 2017/0259872 A1* | 9/2017 | Iwamoto | .................. | B62J 45/42 |
| 2018/0298837 A1* | 10/2018 | Yamashita | .............. | F02D 15/04 |
| 2018/0339699 A1* | 11/2018 | Matsuda | ............... | B60W 30/02 |
| 2020/0355128 A1* | 11/2020 | Kinjo | ................... | F02D 41/022 |

* cited by examiner

US 11,821,376 B1

UTILITY VEHICLE

BACKGROUND OF THE INVENTION

Technical Field

The present disclosure relates to a utility vehicle.

Related Art

U.S. Pat. No. 8,382,620 B2 discloses a utility vehicle including an engine and a drive wheel driven by a drive force output from the engine, in which a power transmission path between the engine and the drive wheel is provided with a clutch function for disconnecting power transmission when an engine rotational speed is low. The clutch function operates when the engine rotational speed falls below an engage rotational speed.

SUMMARY

In this utility vehicle, for example, when the engine rotational speed is lower than the engage rotational speed when traveling on a downhill, there is a case where the clutch function disconnects power transmission, and a so-called engine brake does not operate. As a result, in order to suppress an increase in speed of the utility vehicle, it is necessary to operate a brake device (referred to as a foot brake) provided on the wheel side, and a load on the brake device increases.

An object of the present disclosure is to provide a utility vehicle including, in a power transmission path between an engine and a drive wheel, a clutch function for disconnecting power transmission when the rotational speed of the engine is low, the utility vehicle capable of operating an engine brake even while traveling on a downhill.

One aspect of the present disclosure provides a utility vehicle including:

an engine;
a drive wheel that is rotationally driven by a drive force output from the engine;
a power transmission path between the engine and the drive wheel;
a clutch that is provided in the power transmission path and disconnects power transmission when a rotational speed of the engine is lower than an engage rotational speed;
an engine rotational speed sensor that senses an engine rotational speed; and
a controller that controls operation of the engine, in which the controller includes
an engine brake necessity determination circuitry that determines necessity of engine brake, and
an engine rotational speed control circuitry that controls a rotational speed of an engine, and
when the engine brake necessity determination circuitry determines that engine brake is necessary, the engine rotational speed control circuitry performs automatic engine brake control of increasing the rotational speed of the engine so as to be equal to or higher than the engage rotational speed.

According to the present disclosure, since when it is determined that the engine brake is necessary, the controller increases the rotational speed of the engine so as to be equal to or higher than the engage rotational speed, the engine brake can be operated by connecting the clutch. Due to thus, in order to operate the engine brake, it is possible to eliminate a need to maintain the rotational speed of the engine to be equal to or higher than the engage rotational speed by manual operation by the driver, for example, accelerator operation, and thus convenience is improved.

BRIEF DESCRIPTION OF THE DRAWINGS

The foregoing and the other features of the present disclosure will become apparent from the following description and drawings of an illustrative embodiment of the disclosure in which.

DETAILED DESCRIPTION OF EMBODIMENTS

A utility vehicle according to an embodiment of the present disclosure will be described below with reference to the accompanying drawings.

Note that the following description is merely exemplary in nature, and is not intended to limit the present disclosure, its application, or its use.

First Embodiment

A utility vehicle 100 according to a first embodiment of the present disclosure will be described with reference to FIGS. 1 to 7. In the following description, the front-rear direction, the right-left direction, and the up-down direction as viewed from the driver are referred to as front-rear direction, right-left direction, and up-down direction of the utility vehicle 100 and each component.

Figure 1:
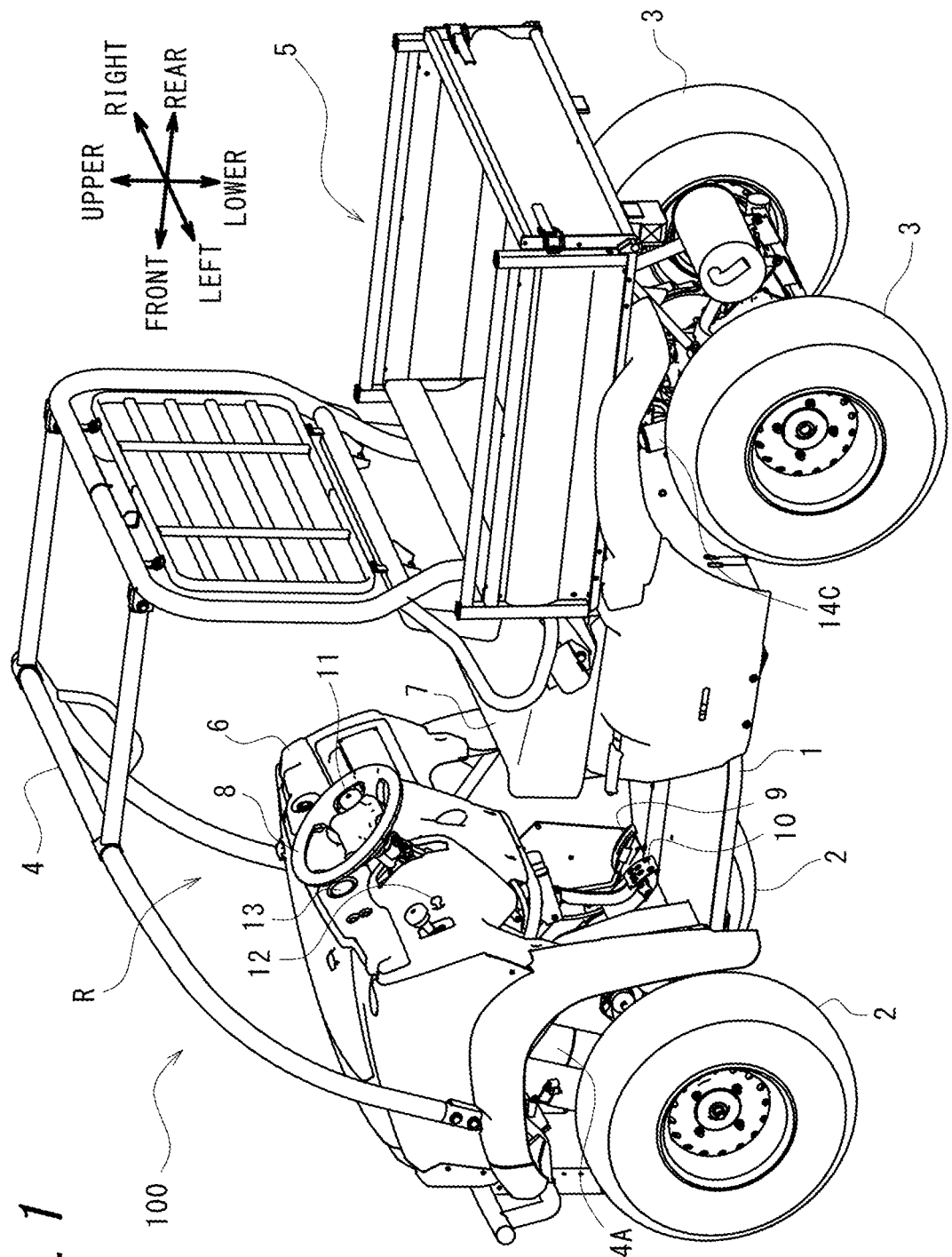
FIG. 1 is a perspective view of a vehicle according to a first embodiment of the present disclosure.

FIG. 1 is a perspective view of the utility vehicle 100 as viewed from the left rear. As illustrated in FIG. 1, the utility vehicle 100 includes a vehicle body frame 1, right and left front wheel suspensions 14A and 14B (see FIG. 2) disposed at the front end of the vehicle body frame 1, right and left rear wheel suspensions 14C and 14D (see FIG. 2) disposed at the rear end of the vehicle body frame 1, right and left front wheels 2 suspended respectively on the front wheel suspensions 14A and 14B, right and left rear wheels 3 suspended respectively on the rear wheel suspensions 14C and 14D, a riding space R surrounded by a rollover protective structure (ROPS) 4, and a cargo bed 5 disposed on the rear side of the riding space R.

In the riding space R, a bench type seat 7 is disposed, and a dash panel 6 and a steering wheel 8 are disposed on the front side of the seat 7. The seat 7 has a driver's seat on the left side and a passenger's seat on the right side. On the dash panel 6, a shift lever 11 (shift operator) is disposed on the right side of the steering wheel 8. By operating the shift lever 11, the driver can switch a variable transmission stage of a gear variable transmission 40 (see FIG. 2) described later to a forward low-speed stage, which is a low-speed gear ratio, a forward high-speed stage, which is a high-speed gear ratio lower in gear ratio than the forward low-speed stage, a reverse stage, and a neutral.

The dash panel 6 is provided with an automatic engine brake control switch 12 (changeover switch) for switching an operation mode of the automatic engine brake control described later between enabled and disabled, and a display 13 for displaying various information such as a vehicle speed and an engine rotational speed. In the riding space R, an accelerator pedal 9 (acceleration operator) and a brake pedal 10 (brake operator) to be depressed and operated by the driver are disposed at the feet on the front side of the seat 7.

Figure 2:
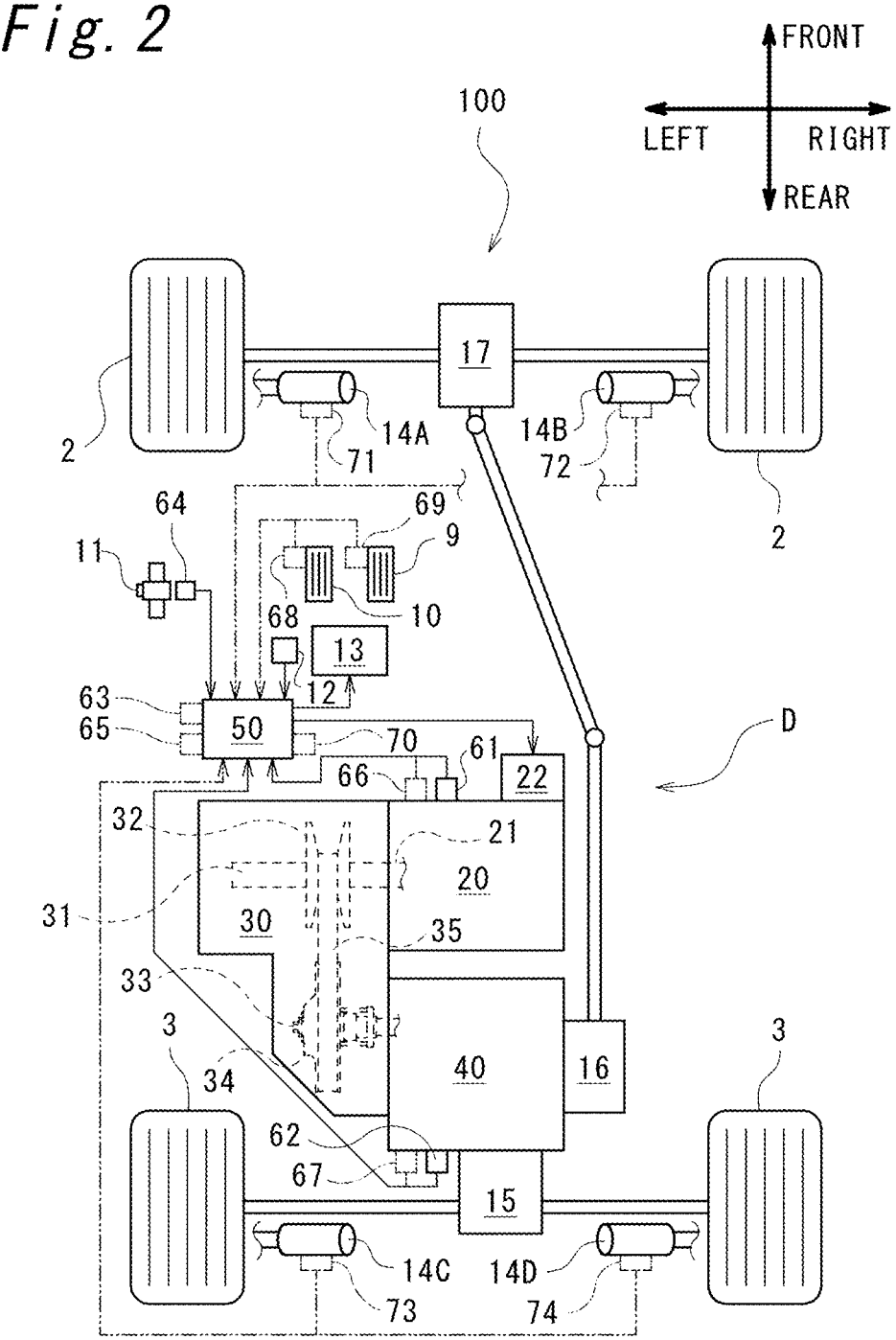
FIG. 2 is a view schematically illustrating a drive system.

FIG. 2 schematically illustrates the drive system of the utility vehicle 100. As illustrated in FIG. 2, the utility vehicle 100 includes an engine 20 as a drive source, a V-belt type continuously variable transmission 30, and the gear variable transmission 40. In the present embodiment, the gear variable transmission 40 is disposed on the rear side of the engine 20, and the V-belt type continuously variable transmission 30 is disposed over the left side surfaces of the engine 20 and the gear variable transmission 40. The engine 20, the V-belt type continuously variable transmission 30, and the gear variable transmission 40 are disposed in a space extending from below the seat 7 to below the cargo bed 5.

A rear differential 15 for the rear wheels 3 is disposed behind the gear variable transmission 40. A two-wheel drive and four-wheel drive switcher 16 is disposed on the right side of the gear variable transmission 40. A front differential 17 for the front wheels 2 is disposed between the right and left front wheels 2. The two-wheel drive and four-wheel drive switcher 16 switches between a four-wheel drive state in which the drive force shifted by the gear variable transmission 40 is transmitted also to the front wheel 2 side in addition to the rear wheel 3 side and a two-wheel drive state in which the power transmission to the front wheel 2 side is interrupted and only the rear wheel 3 side is driven.

The drive force output from the engine 20 is input to the V-belt type continuously variable transmission 30, is shifted to a gear ratio corresponding to an operation situation in the V-belt type continuously variable transmission 30, and is then input to the gear variable transmission 40. The gear variable transmission 40 shifts the input drive force to the variable transmission stage selected by the driver via the shift lever 11. The drive force shifted in the gear variable transmission 40 is distributed to the right and left rear wheels 3 via the rear differential 15. In the four-wheel drive state, the drive force output from the two-wheel drive and four-wheel drive switcher 16 is also distributed to the right and left front wheels 2 via the front differential 17. That is, a power transmission path D is configured from the engine 20 to the drive wheels 2 and 3 via the V-belt type continuously variable transmission 30 and the gear variable transmission 40.

In the present embodiment, the engine 20 is a gasoline engine disposed such that a crankshaft 21 that is an output shaft directs toward the vehicle width direction. The engine 20 may be a single-cylinder engine or a multi-cylinder engine, and further may be a diesel engine. The engine 20 includes a throttle valve 22 that adjusts an intake air amount, an injector 23 (see FIG. 4) that injects fuel, and an ignition plug 24 (see FIG. 4) that ignites an air-fuel mixture in a combustion chamber. The opening of the throttle valve 22 is electronically controlled by a controller 50 described later.

The V-belt type continuously variable transmission 30 includes a drive shaft 31 coupled with the crankshaft 21 of the engine 20, a drive pulley assembly 32 provided on the drive shaft 31, a driven shaft 33 coupled to an input shaft 41 of the gear variable transmission 40, a driven pulley assembly 34 provided on the driven shaft 33, and a V-belt 35 wound around over the pulley assemblies 32 and 34.

Figure 3:
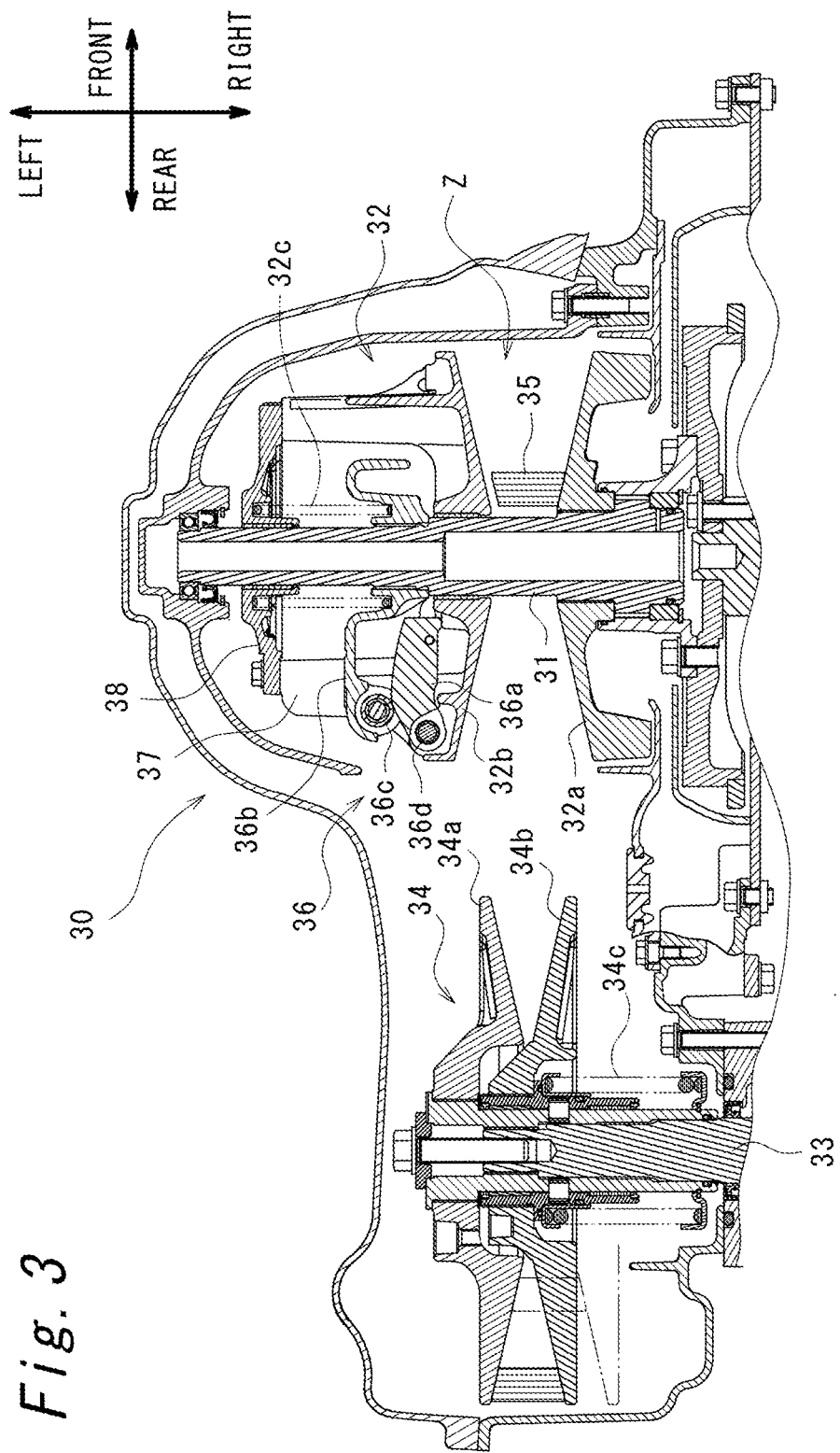
FIG. 3 is a cross-sectional view of a V-belt type continuously variable transmission.

FIG. 3 is a cross-sectional view of the V-belt type continuously variable transmission 30 along the shaft centers of the drive shaft 31 and the driven shaft 33. As illustrated in FIG. 3, the drive pulley assembly 32 includes a fixed sheave 32a fixed to the drive shaft 31 immovably in the axial direction, a movable sheave 32b fitted to the drive shaft 31 movably in the axial direction, and a flyweight sheave thrust generator 36.

The driven pulley assembly 34 includes a fixed sheave 34a fixed to the driven shaft 33 immovably in the axial direction, and a movable sheave 34b movable in the axial direction with respect to the driven shaft 33. Furthermore, the driven pulley assembly 34 is provided with a spring 34c that biases the movable sheave 34b toward the fixed sheave 34a. The spring 34c maintains a large winding radius of the V-belt 35 in the driven pulley assembly 34.

Hereinafter, the drive pulley assembly 32 will be described in detail. The fixed sheave 32a is fixed to a right end of the drive shaft 31. The movable sheave 32b opposes the fixed sheave 32a from the left side in the axial direction. The V-belt 35 is compressed in the axial direction by a conical compression surfaces formed on each of the fixed sheave 32a and the movable sheave 32b, so that power transmission between the drive pulley assembly 32 and the V-belt 35 is configured.

A plate-shaped support 38 is coupled to the back surface of the movable sheave 32b via a plurality of coupling arms 37 extending leftward. The support 38 moves in the axial direction with respect to the drive shaft 31 integrally with the movable sheave 32b.

The sheave thrust generator 36 includes a plurality of (for example, four) flyweights 36a disposed between the back surface of the movable sheave 32b and the support 38, a roller support member 36b, and a plurality of pressure receiving rollers 36c attached to the roller support member 36b. The roller support member 36b is fixed to the left end of the drive shaft 31 and rotates integrally with the drive shaft 31. The movable sheave 32b rotates integrally with the drive shaft 31 via the roller support member 36b as the coupling arm 37 engages with the roller support member 36b in the circumferential direction of the drive shaft 31.

The plurality of flyweights 36a are arranged at intervals in the circumferential direction of the drive shaft 31. Each of the flyweights 36a is supported on the back surface of the movable sheave 32b via a pin 36d so as to be expandable in the radial direction of the drive shaft 31, and abuts on each of the pressure receiving rollers 36c from the right side.

When the drive shaft 31 rotates, the flyweight 36a expands in the radial direction by the centrifugal force, and the load abutting on the pressure receiving roller 36c from the right side increases, so that a load to the right side is generated in the flyweight 36a as a reaction force thereof. The load generated in the flyweight 36a constitutes a sheave thrust for moving the movable sheave 32b to the right. Meanwhile, the drive pulley assembly 32 further includes a return spring 32c. The return spring 32c is elastically provided between the roller support member 36b and the support 38. The support 38 (that is, the movable sheave 32b) is biased to the left side by the return spring 32c.

Therefore, with respect to the movable sheave 32b, a sheave thrust in the right direction that increases with the rotation of the drive shaft 31 generates through the sheave thrust generator 36, and a return force in the left direction generates through the return spring 32c.

When an engine rotational speed N of the engine 20 is an idle rotational speed $N_{IDLE}$, the return force is larger than the sheave thrust, and therefore the movable sheave 32b is separated to the left side with respect to the V-belt 35, and power transmission is not generated between the drive pulley assembly 32 and the V-belt 35.

From this state, the rotational speed of the drive shaft 31 also increases with the increase in rotational speed of the engine 20. As a result, the sheave thrust gradually increases, so that the movable sheave 32b moves to the right side against the return force and starts abutting on the V-belt 35. The engine rotational speed N when the abutting force of the movable sheave 32b with respect to the V-belt 35 is increased enough to cause power transmission between them is referred to as engage rotational speed N1.

That is, the power transmission between the drive pulley assembly 32 and the V-belt 35 occurs at less than 100% when the engine rotational speed N is equal to or higher than the idle rotational speed $N_{IDLE}$ and lower than the engage rotational speed N1, and gradually increases with the increase in the engine rotational speed N, and occurs at 100% when the engine rotational speed N becomes equal to or higher than the engage rotational speed N1. Therefore, the drive pulley assembly 32 constitutes a clutch Z according to the present disclosure.

Therefore, when the engine rotational speed N is the idle rotational speed $N_{IDLE}$ at the time of stopping, the power transmission is disconnected at the clutch Z, and the creep phenomenon does not occur in the utility vehicle 100. When the engine rotational speed N gradually increases from the idle rotational speed $N_{IDLE}$, the clutch Z is gradually connected to become in a so-called half-clutch state, and the drive force transmitted to the drive wheels 2 and 3 gradually increases.

Thereafter, when the engine rotational speed N becomes equal to or higher than the engage rotational speed N1, the clutch Z is fully connected, and the utility vehicle 100 travels at a vehicle speed based on the engine rotational speed N and the gear ratio established in the V-belt type continuously variable transmission 30 and the gear variable transmission 40. In this state, when the engine rotational speed N is equal to or higher than the engage rotational speed N1, the connection of the clutch Z is maintained, so that the engine brake operates when the accelerator is turned off. Here, in the present description, the engine brake means that, for example, rotation of the engine by the drive force input from the drive wheel side to the engine is braked by receiving resistance due to pumping loss, sliding resistance, and the like in the engine.

On the other hand, when braking by a parking brake (not illustrated) is released in a state where the utility vehicle 100 is stopped by operating, for example, the parking brake on a road surface having a downhill slope with the engine rotational speed N being the idle rotational speed $N_{IDLE}$, the engine brake of the utility vehicle 100 is not operated because the engine rotational speed N is maintained at the idle rotational speed $N_{IDLE}$, and thus a vehicle speed V may increase unintentionally.

The utility vehicle 100 according to the present disclosure includes the controller 50 in order to prevent the unintentional increase in the vehicle speed V. In order to automatically operate the engine brake, the controller 50 performs automatic engine brake control for maintaining the connection of the clutch Z with the engine rotational speed N being equal to or higher than the engage rotational speed N1.

Figure 4:
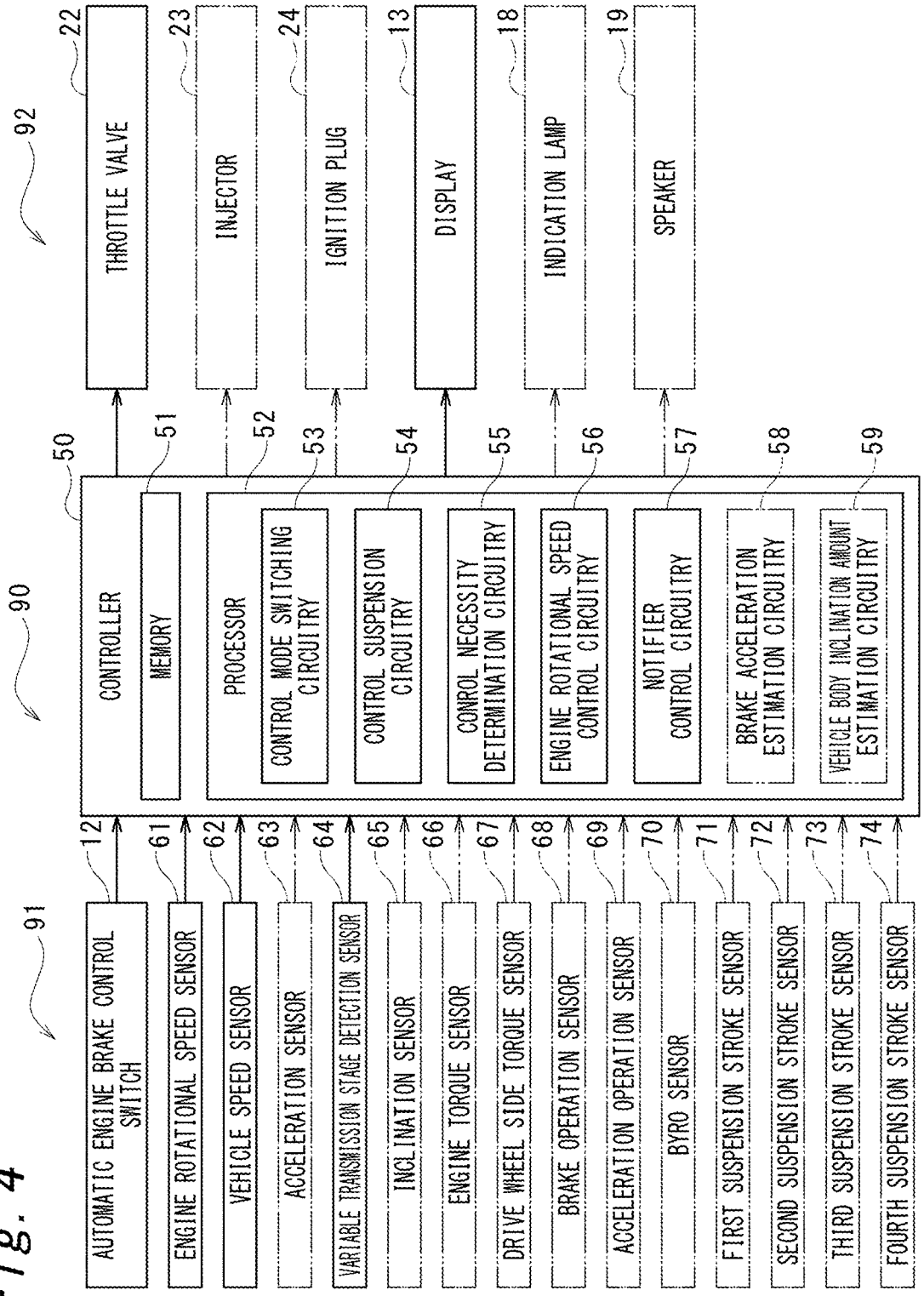
FIG. 4 is a block diagram schematically illustrating a control system according to automatic engine brake control.

FIG. 4 is a view schematically illustrating a control system 90 according to the automatic engine brake control of the utility vehicle 100. As illustrated in FIG. 4, the control system 90 includes the controller 50, an input device 91, and an output device 92. Based on the signal from the input device 91, the controller 50 determines the necessity of automatic engine brake control, and controls the operation of the output device 92 related to the automatic engine brake control based on the determination result.

The input device 91 includes the automatic engine brake control switch 12, an engine rotational speed sensor 61, a vehicle speed sensor 62, a variable transmission stage detection sensor 64, and an acceleration operation sensor 69.

As described above, the automatic engine brake control switch 12 is disposed on the dash panel 6 and is turned on/off by the driver. As illustrated in FIG. 2, the engine rotational speed sensor 61 is provided in the engine 20 and detects the rotational speed of the crankshaft 21. The vehicle speed sensor 62 is provided in the gear variable transmission 40 and detects the rotational speed of an output shaft (not illustrated) output from the gear variable transmission 40. The variable transmission stage detection sensor 64 is provided in the shift lever 11 and detects a variable transmission stage position of the shift lever 11 operated by the driver. The acceleration operation sensor 69 is provided on the accelerator pedal 9 and detects a driver's operation of depressing the accelerator pedal 9.

As illustrated in FIG. 4, the output device 92 includes the throttle valve 22, the injector 23, and the ignition plug 24 as apparatuses for controlling the operation state of the engine 20, specifically, as apparatuses for controlling the engine rotational speed N, and the display 13 as a notifier that notifies indication related to automatic engine brake control. Instead of or in addition to the display 13, an indication lamp 18 and/or a speaker 19 may be provided as the notifier.

The controller 50 includes a memory 51 that is a storage device and a processor 52 that is an arithmetic processing device. The memory 51 stores various data and programs related to automatic engine brake control.

Functions implemented by the components described in the present description may be implemented in a circuitry or processing circuitry, including a general-purpose processor, an application specific processor, an integrated circuitry, application specific integrated circuits (ASICs), a central processing unit (CPU), a conventional circuitry, and/or combinations thereof that are programmed to implement the described functions. The processor includes a transistor and other circuits, and is regarded as a circuitry or a processing circuitry. The processor may be a programmed processor that executes a program stored in the memory. In the present description, the circuitry, the unit, and the means are hardware programmed to implement described functions or hardware executing the functions. The hardware may be any hardware disclosed in the present description or any hardware programmed so as to implement the described functions or known to execute the described functions. In a case where the hardware is a processor regarded as a type of circuitry, the circuitry, the means, or the unit is a combination of hardware and software used to configure the hardware and/or a processor.

The processor 52 includes a control mode switching circuitry 53, a control suspension circuitry 54, a control necessity determination circuitry 55, an engine rotational speed control circuitry 56, and a notifier control circuitry 57 as circuits that implement each function related to automatic engine brake control.

The control mode switching circuitry 53 detects on/off of the automatic engine brake control switch 12, and sets the automatic engine brake control mode to the operation mode if the automatic engine brake control switch 12 is on, and carries out the automatic engine brake control if a predetermined condition is satisfied. On the other hand, if the automatic engine brake control switch 12 is off, the control mode switching circuitry 53 turns off the automatic engine brake control mode.

The control suspension circuitry 54 suspends the automatic engine brake control when the variable transmission stage detected by the variable transmission stage detection sensor 64 in a state where the automatic engine brake control mode is on is not the forward low-speed stage. In other words, when the variable transmission stage is the forward low-speed stage, the automatic engine brake control is carried out according to the determination by the control necessity determination circuitry 55.

The control necessity determination circuitry 55 determines necessity of automatic engine brake control. Specifically, the control necessity determination circuitry 55 determines that the automatic engine brake control is necessary when it is determined that the engine rotational speed N is lower than the engage rotational speed N1 based on the detection result of the engine rotational speed sensor 61 and that the vehicle speed V is equal to or higher than a predetermined vehicle speed V1 based on the detection result by the vehicle speed sensor 62. The predetermined vehicle speeder V1 is, for example, 3 miles per hour. For example, based on the rotational speed of the output shaft of the gear variable transmission 40 detected by the vehicle speed sensor 62, the rotational speed of the drive wheel may be calculated, and the vehicle speed V may be calculated from the outer diameter of the drive wheel.

The control necessity determination circuitry 55 determines that the automatic engine brake control is "unnecessary" when the acceleration operation by the driver is detected by the acceleration operation sensor 69 or when the vehicle speed V decreases to lower than the predetermined vehicle speed V1 during the execution of the automatic engine brake control.

The engine rotational speed control circuitry 56 controls the operation of the engine 20 so that the engine rotational speed N is maintained at equal to or higher than the engage rotational speed N1 by controlling one or a plurality of the opening of the throttle valve 22, the fuel injection amount by the injector 23, and the ignition timing by the ignition plug 24. When the control necessity determination circuitry 55 determines that the automatic engine brake control is "unnecessary" during the execution of the automatic engine brake control, the engine rotational speed control circuitry 56 ends the automatic engine brake control.

The notifier control circuitry 57 controls the display 13 to display, on the display 13, that the control mode of the automatic engine brake control is on when the control mode is on, and to indicate that the control is being performed when the automatic engine brake control is being performed. When the indication lamp 18 and/or the speaker 19 are provided instead of/in addition to the display 13, the notifier control circuitry 57 controls these apparatuses to notify that the automatic engine brake control mode is on and that the control is being performed.

Next, the flow of automatic engine brake control will be described with reference to the flowchart illustrated in FIG. 5, the subroutine illustrated in FIG. 6, and the exemplary time chart illustrated in FIG. 7. A series of procedures in the flowchart of FIG. 5 and the subroutine of FIG. 6 is repeatedly executed at a predetermined control cycle (for example, 1 second or more and 3 seconds or less).

Figure 5:
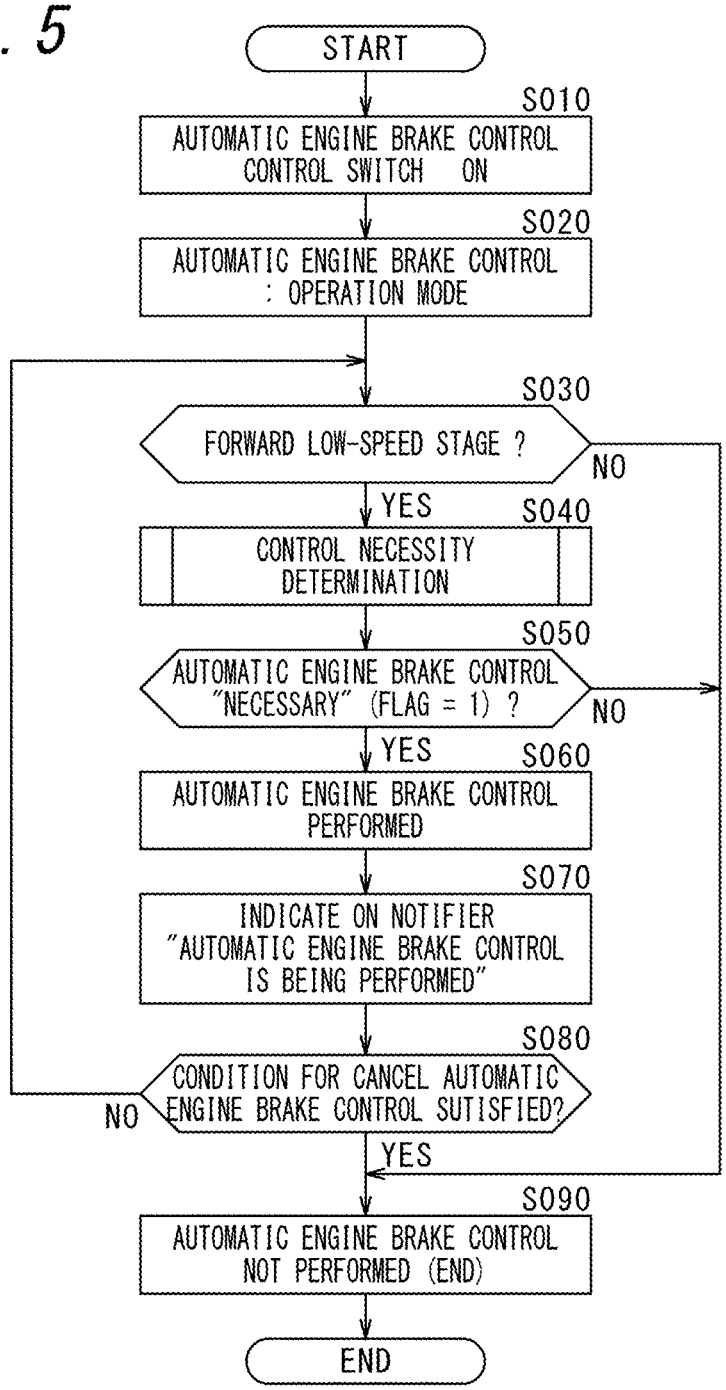
FIG. 5 is a flowchart illustrating a flow of automatic engine brake control.

First, with reference to FIG. 5, the driver turns on the automatic engine brake control switch 12 (step S010). As a result, the control mode switching circuitry 53 sets the automatic engine brake control mode to the operation mode (step S020). Next, the control suspension circuitry 54 determines whether or not the variable transmission stage is the forward low-speed stage (step S030). When the variable transmission stage is the forward low-speed stage (YES in step S030), the control necessity determination circuitry 55 determines the necessity of the automatic engine brake control (step S040).

Figure 6:
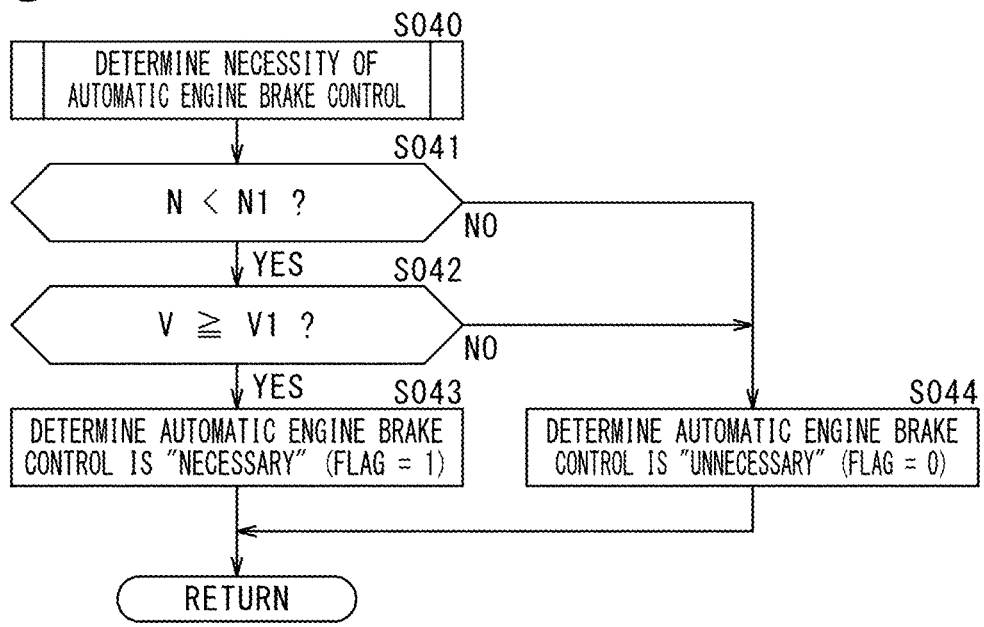
FIG. 6 is a subroutine illustrating necessity determination of automatic engine brake control.

FIG. 6 is a subroutine illustrating the flow of necessity determination of the automatic engine brake control by the control necessity determination circuitry 55. As illustrated in FIG. 6, first, the control necessity determination circuitry 55 determines whether or not the engine rotational speed N is lower than the engage rotational speed N1 (step S041).

When the engine rotational speed N is lower than the engage rotational speed N1 (YES in step S041), the control necessity determination circuitry 55 determines whether or not the vehicle speed V is equal to or higher than the predetermined vehicle speed V1 (step S042). When the vehicle speed V is equal to or higher than the predetermined vehicle speed V1 (YES in step S042), the control necessity determination circuitry 55 determines that the automatic engine brake control is "necessary", sets a control flag to 1 (step S043), and ends the processing in this subroutine.

On the other hand, when the engine rotational speed N is equal to or higher than the engage rotational speed N1 (NO in step S041) or when the vehicle speed V is lower than the predetermined vehicle speed V1 (NO in step S042), the control necessity determination circuitry 55 determines that the automatic engine brake control is "unnecessary", sets the control flag to 0 (step S044), and ends the processing in this subroutine.

Returning to FIG. 5, when the control necessity determination circuitry 55 determines that the automatic engine brake control is "necessary (control flag=1)" (YES in step S050), the engine rotational speed control circuitry 56 performs the automatic engine brake control (step S060). Next, the notifier control circuitry 57 causes the display 13 to indicate that the automatic engine brake control is being performed (step S070).

Thereafter, when the control necessity determination circuitry 55 detects an acceleration operation by the driver or when the end condition such as a case where the vehicle speed V decreases to be lower than the predetermined vehicle speed V1 is satisfied is detected (YES in step S080), the engine rotational speed control circuitry 56 ends the automatic engine brake control (step S090). On the other hand, when the end condition of the automatic engine brake control is not satisfied (NO in step S080), the process returns to step S030, and steps S030 to S080 are repeatedly performed.

When the variable transmission stage is not the forward low-speed stage (NO in step S030) or when the control necessity determination circuitry 55 determines that the automatic engine brake control is "unnecessary (control flag=0)" (NO in step S50), the automatic engine brake control is not performed (step S090), and the process in this flowchart ends.

Figure 7:
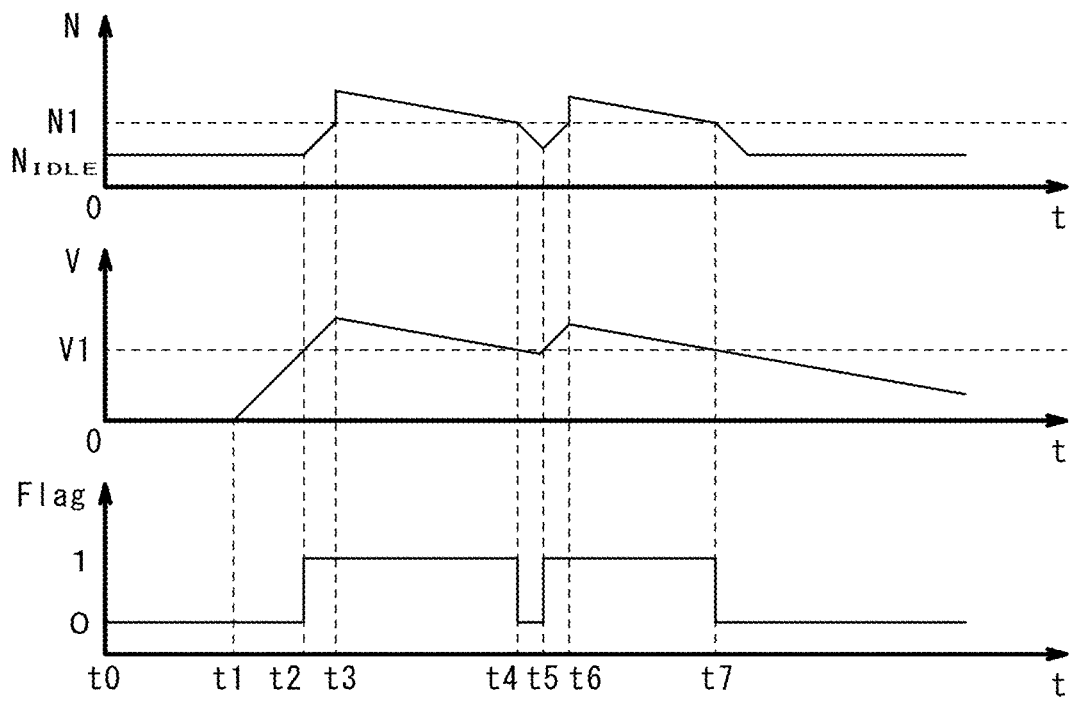
FIG. 7 is a time chart illustrating exemplary operation by automatic engine brake control.

FIG. 7 is a time chart exemplarily illustrating the flow of the series of processing described above. The time chart in FIG. 7 assumes that the utility vehicle 100 stops at time t0 by operating the parking brake (not illustrated) on a traveling road surface having a downhill slope with the engine rotational speed N as the idle rotational speed $N_{IDLE}$. In the utility vehicle 100, the automatic engine brake control mode is the operation mode, and the variable transmission stage is set to the forward low-speed stage.

At time to, since the engine rotational speed N is the idle rotational speed $N_{IDLE}$, the clutch Z in the V-belt type continuously variable transmission 30 is in a disconnected state. Thereafter, at time t1, as the parking brake is released, the utility vehicle 100 goes down the traveling road surface having a downhill slope, so that the vehicle speed V gradually increases. At this time, since the engine rotational speed N is the idle rotational speed $N_{IDLE}$, the clutch Z remains disconnected and the engine brake does not operate.

Next, when the vehicle speed V becomes equal to or higher than the predetermined vehicle speed V1 at time t2, the control necessity determination circuitry 55 determines that the automatic engine brake control is "necessary", changes the control flag from "0" to "1", and the engine rotational speed control circuitry 56 controls the throttle valve 22, the injector 23, and the ignition plug 24 in order to increase the engine rotational speed N. At time t3, when the engine rotational speed N becomes equal to or higher than the engage rotational speed N1, the clutch Z is connected, the engine rotational speed N is further increased by the drive force transmitted from the drive wheel side, and the engine brake is operated.

Thereafter, the vehicle speed V decreases due to the operation of the engine brake, and the engine rotational speed N also decreases accordingly. When the vehicle speed V becomes lower than the predetermined vehicle speed V1 at time t4, the control necessity determination circuitry 55 determines that the automatic engine brake control is "unnecessary", changes the control flag from "1" to "0", and the engine rotational speed control circuitry 56 ends the automatic engine brake control.

Thereafter, the engine rotational speed N decreases from the engage rotational speed N1 toward the idle rotational speed $N_{IDLE}$, and when the vehicle speed V turns to increase again and exceeds the predetermined vehicle speed V1 at time t5, the automatic engine brake control is performed again.

The utility vehicle 100 according to the embodiment described above has the following effects.

(1) The utility vehicle 100 according to the present disclosure includes:
  the engine 20;
  the drive wheels 2 and 3 that are rotationally driven by a drive force output from the engine 20;
  the power transmission path D between the engine 20 and the drive wheels 2 and 3;
  the clutch Z that is provided on the power transmission path D and disconnects power transmission when the engine rotational speed N is lower than the engage rotational speed N1;
  the engine rotational speed sensor 61 that senses the engine rotational speed N; and
  the controller 50 that controls the operation of the engine 20, in which
  the controller 50 includes
  the control necessity determination circuitry 55 that determines necessity of engine brake, and
  the engine rotational speed control circuitry 56 that controls the rotational speed of the engine 20, and
  when the control necessity determination circuitry 55 determines that engine brake is necessary, the engine rotational speed control circuitry 56 performs automatic engine brake control of increasing the engine rotational speed N so as to be equal to or higher than the engage rotational speed N1.

According to the utility vehicle 100 according to the present disclosure, when it is determined that the engine brake is necessary, since the controller 50 increases the engine rotational speed N to equal to or higher than the engage rotational speed N1, the engine brake can be operated by connecting the clutch Z. Due to thus, in order to operate the engine brake, it is possible to eliminate a need to manually maintain the engine rotational speed N to be equal to or higher than the engage rotational speed N1 by operation by the driver, for example, depression operation on the accelerator pedal 9, and thus convenience is improved.

(2) The utility vehicle 100 according to the present disclosure further includes:
  the vehicle speed sensor 62 that detects a vehicle speed, in which
  a determination condition of the control necessity determination circuitry 55 includes a condition of determining that the engine rotational speed N is lower than the engage rotational speed N1 as well as that the vehicle speed V detected by the vehicle speed sensor 62 is equal to or higher than the predetermined vehicle speed V1.

The predetermined vehicle speed V1 is set to a vehicle speed of equal to or higher than 3 miles per hour, for example.

The determination condition of the control necessity determination circuitry 55 may include an increase in the vehicle speed V in place of or in addition to the above condition.

According to this configuration, the automatic engine brake control can be performed only in a necessary situation.

(3) The utility vehicle 100 according to the present disclosure further includes:
  the shift lever 11 (shift operator) that is switchable between the forward low-speed stage in which the gear ratio in the power transmission path D is set to a low-speed gear ratio and a high-speed shift position in which the gear ratio is set to a forward high-speed stage lower than the low-speed gear ratio; and
  the variable transmission stage detection sensor 64 that detects a variable transmission stage (shift position) of the shift lever 11, in which
  the controller 50 performs automatic engine brake control when the control suspension circuitry 54 detects that the variable transmission stage is the forward low-speed stage.

According to this configuration, the automatic engine brake control is performed only when the utility vehicle 100 is traveling at a relatively low speed. That is, the automatic engine brake control is not performed at the forward high-speed stage where the automatic engine brake control is unnecessary, and the control can be simplified.

(4) The utility vehicle 100 according to the present disclosure further includes:

the acceleration operation sensor 69 that senses an operation on the accelerator pedal 9 by the driver, in which the controller 50 ends the automatic engine brake control when the acceleration operation sensor 69 detects a driver's operation of depressing the accelerator pedal 9 during performing the automatic engine brake control.

According to this configuration, when an acceleration intention of the driver is sensed based on the detection result (for example, when the depression operation on the accelerator pedal 9 is detected) by the acceleration operation sensor 69 during performing the automatic engine brake control, the automatic engine brake control is ended, and therefore traveling according to the intention of the driver is not interrupted.

(5) The utility vehicle 100 according to the present disclosure, in which the engine 20 further includes the throttle valve 22 whose opening is electronically controlled by the controller 50.

According to this configuration, the engine rotational speed N can be easily controlled to be equal to or higher than the engage rotational speed N1 by the electronically controlled throttle valve 22.

(6) The utility vehicle 100 according to the present disclosure further includes:

the display 13 that notifies that automatic engine brake control is being performed.

According to this configuration, the performing status of the automatic engine brake control can be easily grasped based on the notification status on the display 13.

(7) The utility vehicle 100 according to the present disclosure further includes:

the automatic engine brake control switch 12 that selectively switches the enabled and disabled of the automatic engine brake control.

According to this configuration, since it is possible to easily switch the enabled and disabled of the automatic engine brake control, performing of unintended automatic engine brake control is prevented.

Second Embodiment

Figure 8:
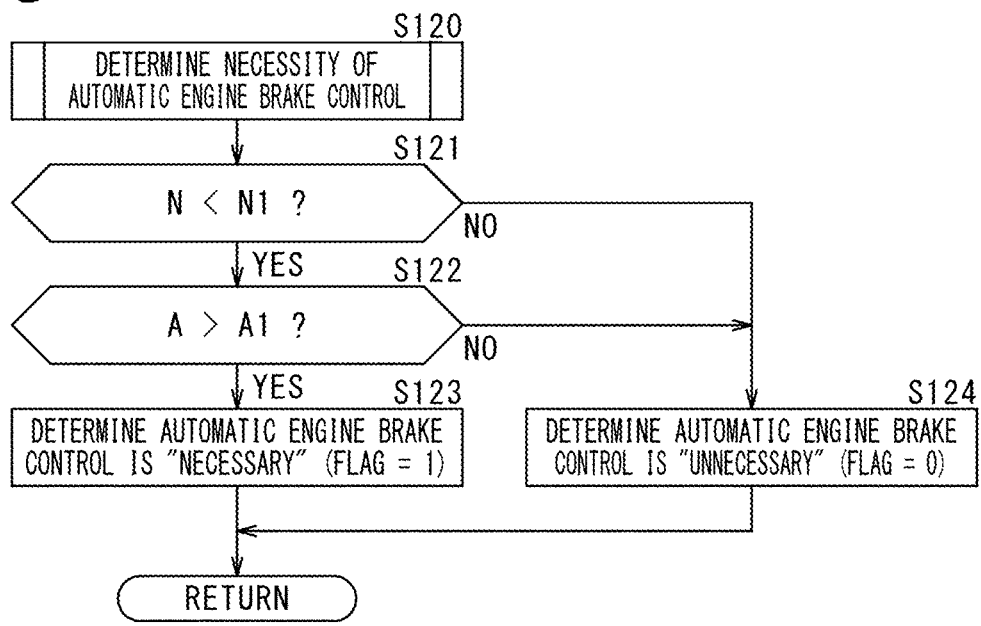
FIG. 8 is a subroutine illustrating necessity determination of automatic engine brake control according to a second embodiment.

FIG. 8 is a subroutine illustrating the flow of processing of necessity determination (step S120) of the automatic engine brake control according to a second embodiment. The second embodiment is different from the first embodiment in that necessity determination of automatic engine brake control is different, and an acceleration sensor 63 is included as the input device 91. Description of configurations common to the first embodiment will be omitted.

As indicated by a two-dot chain line in FIG. 2, the acceleration sensor 63 is provided integrally with the controller 50 in the present embodiment. The acceleration sensor 63 detects acceleration A at least in the traveling direction of the utility vehicle 100.

As illustrated in FIG. 8, the control necessity determination circuitry 55 first determines whether or not the engine rotational speed N is lower than the engage rotational speed N1 (step S121). If the engine rotational speed N is lower than the engage rotational speed N1 (YES in step S121), the control necessity determination circuitry 55 determines whether or not the acceleration A detected by the acceleration sensor 63 is larger than predetermined acceleration A1 (step S122). The predetermined acceleration A1 is, for example, 1.5 m/s$^2$ or more and 2.0 m/s$^2$ or less.

When the acceleration A is larger than the predetermined acceleration A1 (YES in step S122), the control necessity determination circuitry 55 determines that the automatic engine brake control is "necessary", sets the control flag to 1 (step S123), and ends the processing in this subroutine. On the other hand, when the engine rotational speed N is equal to or higher than the engage rotational speed N1 (NO in step S121) or when the acceleration A is equal to or less than the predetermined acceleration A1 (NO in step S122), the control necessity determination circuitry 55 determines that the automatic engine brake control is "unnecessary", sets the control flag to 0 (step S124), and ends the processing in this subroutine.

That is, according to the second embodiment, the determination condition of the control necessity determination circuitry 55 includes that the acceleration A1 is equal to or more than the predetermined acceleration A. As a result, it is possible to determine that the traveling road surface has a downhill slope based on the acceleration A1, and thus, it is possible to appropriately determine necessity of automatic engine brake control.

Third Embodiment

Figure 9:
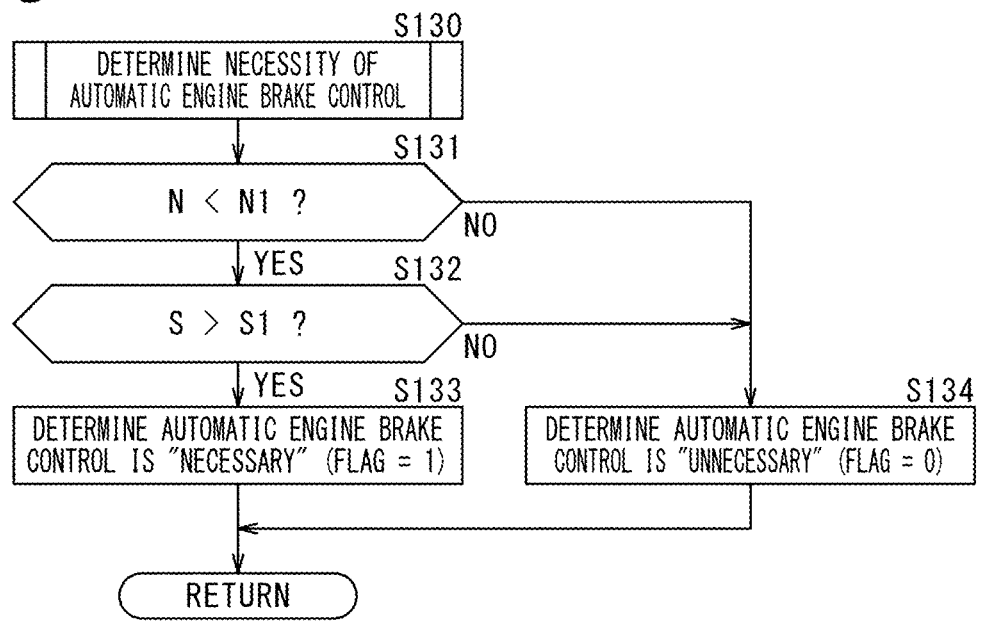
FIG. 9 is a subroutine illustrating necessity determination of automatic engine brake control according to a third embodiment.

FIG. 9 is a subroutine illustrating the flow of processing of necessity determination (step S130) of the automatic engine brake control according to a third embodiment. The third embodiment is different from the first embodiment in that necessity determination of automatic engine brake control is different, and an inclination sensor 65 is further included as the input device 91. Description of configurations common to the first and second embodiments will be omitted.

As indicated by a two-dot chain line in FIG. 2, the inclination sensor 65 is provided integrally with the controller 50 in the present embodiment. The inclination sensor 65 detects an inclination amount S in the vertical direction with respect to the traveling direction of the vehicle body. The inclination amount S may be, for example, an inclination angle or displacement in the vertical direction at a reference point.

As illustrated in FIG. 9, the control necessity determination circuitry 55 first determines whether or not the engine rotational speed N is lower than the engage rotational speed N1 (step S131). When the engine rotational speed N is lower than the engage rotational speed N1 (YES in step S131), the control necessity determination circuitry 55 determines whether or not the inclination amount S detected by the inclination sensor 65 is larger than a predetermined inclination amount S1 (step S132). The predetermined inclination amount S1 is 10°, for example.

When the inclination amount S is larger than the predetermined inclination amount S1 (YES in step S132), the control necessity determination circuitry 55 determines that the automatic engine brake control is "necessary", sets the control flag to 1 (step S133), and ends the processing in this subroutine. On the other hand, when the engine rotational speed N is equal to or higher than the engage rotational speed N1 (NO in step S131) or when the inclination amount S is equal to or less than the predetermined inclination amount S1 (NO in step S132), the control necessity determination circuitry 55 determines that the automatic engine brake control is "unnecessary", sets the control flag to 0 (step S134), and ends the processing in this subroutine.

That is, according to the third embodiment, the inclination sensor 65 that detects the inclination of the vehicle body is further included, and the determination condition of the control necessity determination circuitry 55 includes that the inclination amount S of the vehicle body detected by the inclination sensor 65 is equal to or more than the predetermined inclination amount S1. As a result, it is possible to determine that the traveling road surface has a downhill slope based on the inclination amount S of the vehicle body, and thus, it is possible to appropriately determine necessity of automatic engine brake control.

Fourth Embodiment

Figure 10:
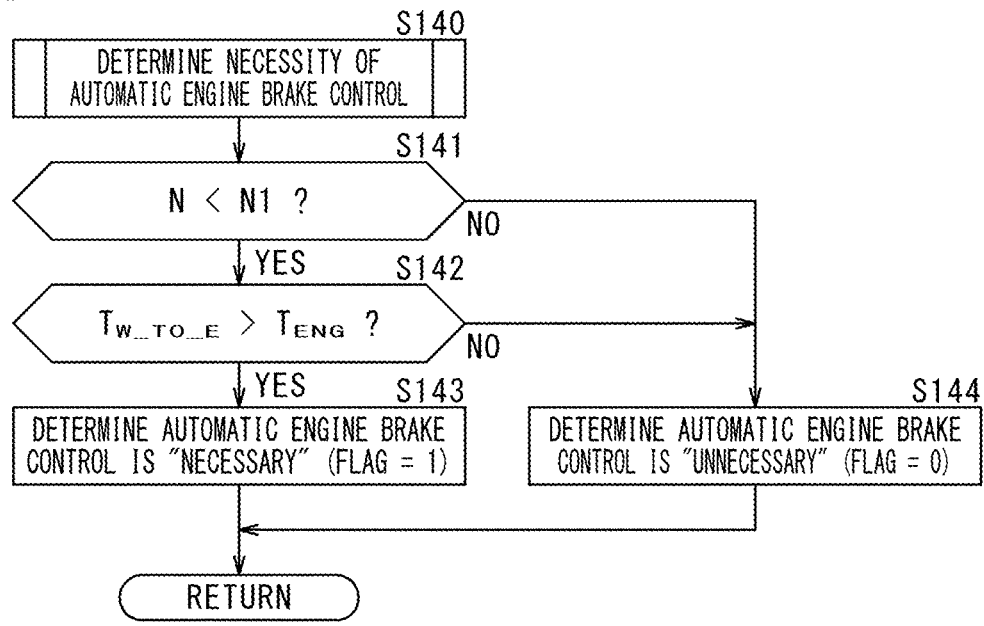
FIG. 10 is a subroutine illustrating necessity determination of automatic engine brake control according to a fourth embodiment.

FIG. 10 is a subroutine illustrating the flow of processing of necessity determination (step S140) of the automatic engine brake control according to a fourth embodiment. The fourth embodiment is different from the first embodiment in that necessity determination of automatic engine brake control is different, and an engine torque sensor 66 and a drive wheel side torque sensor 67 are further included as the input device 91. Description of configurations common to the first to third embodiments will be omitted.

As indicated by a two-dot chain line in FIG. 2, the engine torque sensor 66 is provided in the engine 20. The drive wheel side torque sensor 67 is provided in the gear variable transmission 40. The engine torque sensor 66 detects engine torque TENG output from the crankshaft 21. The drive wheel side torque sensor 67 detects drive wheel torque $T_{WHEEL}$ acting on the output shaft (not illustrated) of the gear variable transmission 40.

As illustrated in FIG. 10, the control necessity determination circuitry 55 first determines whether or not the engine rotational speed N is lower than the engage rotational speed N1 (step S141). When the engine rotational speed N is lower than the engage rotational speed N1 (YES in step S141), the control necessity determination circuitry 55 determines whether or not engine transmission torque $T_{W\_TO\_E}$ transmitted to the engine 20 side and calculated in consideration of the gear ratio in the power transmission path D based on the drive wheel torque $T_{WHEEL}$ detected by the drive wheel side torque sensor 67 is larger than the engine torque TENG detected by the engine torque sensor 66 (step S142).

When the engine transmission torque $T_{W\_TO\_E}$ is larger than the engine torque TENG (YES in step S142), the control necessity determination circuitry 55 determines that the automatic engine brake control is "necessary", sets the control flag to 1 (step S143), and ends the processing in this subroutine. On the other hand, when the engine rotational speed N is equal to or higher than the engage rotational speed N1 (NO in step S141) or when the engine transmission torque $T_{W\_TO\_E}$ is smaller than the engine torque TENG (NO in step S142), the control necessity determination circuitry 55 determines that the automatic engine brake control is "unnecessary", sets the control flag to 0 (step S144), and ends the processing in this subroutine.

That is, according to the fourth embodiment, the engine torque sensor 66 that detects the magnitude of the engine torque TENG output from the engine 20, and the drive wheel side torque sensor 67 that detects the magnitude of the drive wheel torque $T_{WHEEL}$ transmitted to the drive wheels 2 and 3 are further included, and the determination condition of the control necessity determination circuitry 55 includes that the engine transmission torque $T_{W\_TO\_E}$ transmitted to the engine 20 side and calculated based on the drive wheel torque $T_{WHEEL}$ detected by the drive wheel side torque sensor 67 is larger than the engine torque TENG detected by the engine torque sensor 66. As a result, it is possible to determine that the traveling road surface has a downhill slope based on the engine torque TENG and the drive wheel torque $T_{WHEEL}$, and thus, it is possible to appropriately determine necessity of automatic engine brake control. Specifically, when the engine transmission torque $T_{W\_TO\_E}$ is larger than the engine torque TENG, it can be determined that the traveling road surface has a downhill slope.

Fifth Embodiment

Figure 11:
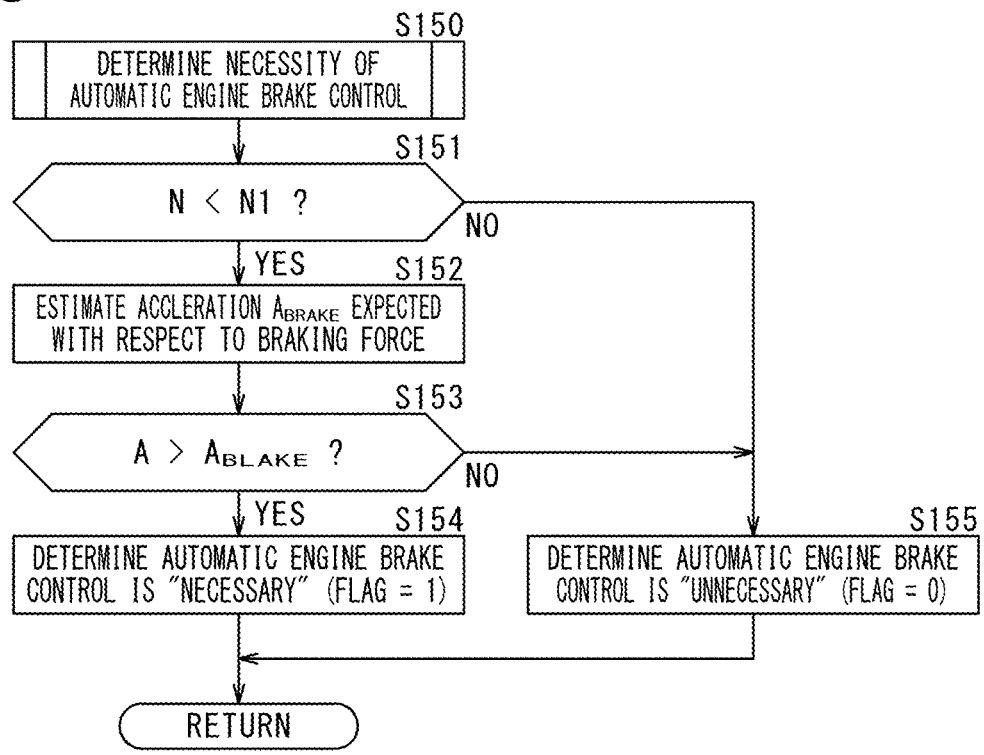
FIG. 11 is a subroutine illustrating necessity determination of automatic engine brake control according to a fifth embodiment.

FIG. 11 is a subroutine illustrating the flow of processing of necessity determination (step S150) of the automatic engine brake control according to a fifth embodiment. The fifth embodiment is different from the first embodiment in that necessity determination of automatic engine brake control is different, and the acceleration sensor 63 and a brake operation sensor 68 are further included as the input device 91, and a brake acceleration estimation circuitry 58 is further included in the controller 50. Description of configurations common to the first to fourth embodiments will be omitted.

As indicated by a two-dot chain line in FIG. 2, the brake operation sensor 68 is provided on the brake pedal 10 and detects a depression operation amount B on the brake pedal 10 by the driver. By reading a map stored in the memory 51, for example, the brake acceleration estimation circuitry 58 estimates estimated brake acceleration $A_{BLAKE}$ expected in a flat ground based on the depression operation amount B. The map is set for each vehicle speed or for each vehicle speed range, for example.

As illustrated in FIG. 11, the control necessity determination circuitry 55 first determines whether or not the engine rotational speed N is lower than the engage rotational speed N1 (step S151). When the engine rotational speed N is lower than the engage rotational speed N1 (YES in step S151), the brake acceleration estimation circuitry 58 estimates the estimated brake acceleration $A_{BLAKE}$ based on the depression operation amount B on the brake pedal 10 detected by the brake operation sensor 68 (step S152).

When the acceleration A detected by the acceleration sensor 63 is larger than the estimated brake acceleration $A_{BLAKE}$ (YES in step S153), the control necessity determination circuitry 55 determines that the automatic engine brake control is "necessary", sets the control flag to 1 (step S154), and ends the processing in this subroutine. On the other hand, when the engine rotational speed N is equal to or higher than the engage rotational speed N1 (NO in step S151) or when the estimated brake acceleration $A_{BLAKE}$ is equal to or more than the acceleration A (NO in step S153), the control necessity determination circuitry 55 determines that the automatic engine brake control is "unnecessary", sets the control flag to 0 (step S155), and ends the processing in this subroutine.

That is, according to the fifth embodiment, the acceleration sensor 63 that detects the acceleration and the brake operation sensor 68 that senses the operation amount on the brake pedal 10 by the driver for applying braking to the drive wheels 2 and 3 are further included, and the determination condition of the control necessity determination circuitry 55 includes a condition indicating a relationship between the depression operation amount B on the brake pedal 10 by the driver sensed by the brake operation sensor 68 and the acceleration A detected by the acceleration sensor 63. As a result, it is possible to determine that the traveling road surface has a downhill slope based on the estimated brake acceleration $A_{BLAKE}$ based on the depression operation amount B on the brake pedal 10 and the acceleration A (the degree of deceleration of the vehicle speed), and thus, it is possible to appropriately determine necessity of engine brake control. Specifically, when the acceleration A is larger than the estimated brake acceleration $A_{BLAKE}$, it can be determined that the traveling road surface has a downhill slope.

Sixth Embodiment

Figure 12:
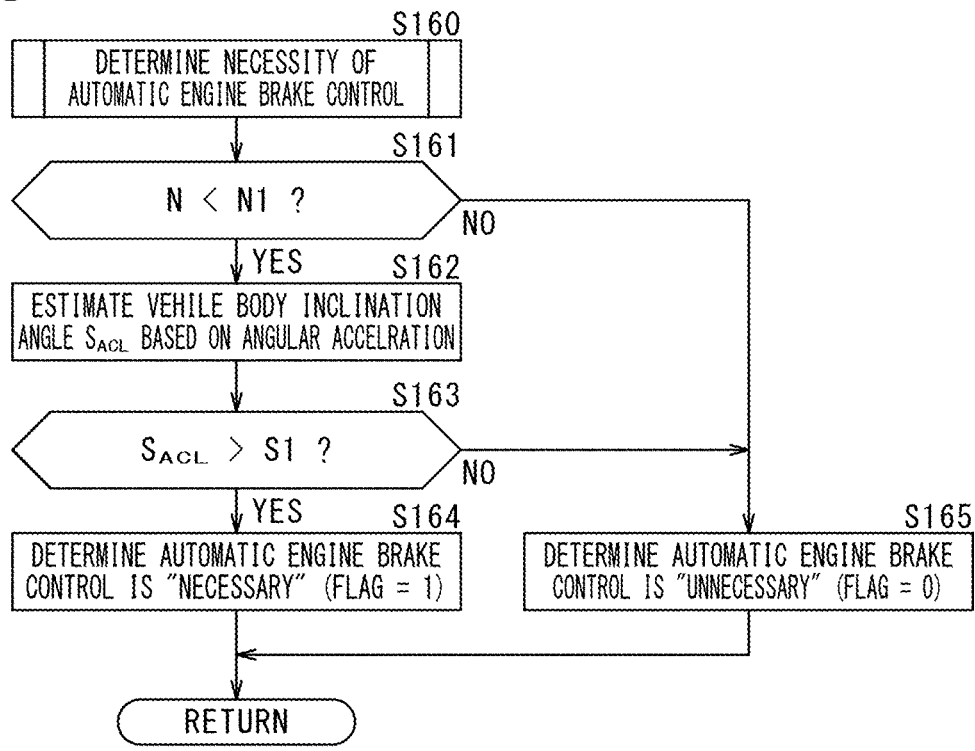
FIG. 12 is a subroutine illustrating necessity determination of automatic engine brake control according to a sixth embodiment.

FIG. 12 is a subroutine illustrating the flow of processing of necessity determination (step S160) of the automatic engine brake control according to a sixth embodiment. The sixth embodiment is different from the first embodiment in that necessity determination of automatic engine brake control is different, and a gyro sensor 70 (angular acceleration sensor) is further included as the input device 91, and a vehicle body inclination amount estimation circuitry 59 is further included in the controller 50. Description of configurations common to the first to fifth embodiments will be omitted.

As indicated by a two-dot chain line in FIG. 2, the gyro sensor 70 is provided integrally with the controller 50 in the present embodiment. The gyro sensor 70 detects angular acceleration $A_{ANG}$ of the vehicle body around an axis along the direction in the vehicle width direction. The vehicle body inclination amount estimation circuitry 59 estimates an estimated inclination amount $S_{ACL}$ in the vertical direction toward the traveling direction of the vehicle body based on the angular acceleration $A_{ANG}$ of the vehicle body. For example, when traveling from a flat ground to a downhill slope road surface, the angular acceleration $A_{ANG}$ of the vehicle body occurs in a direction rotating downward toward the front. The estimated inclination amount $S_{ACL}$ may be, for example, an inclination angle or displacement in the vertical direction at a reference point.

As illustrated in FIG. 12, the control necessity determination circuitry 55 first determines whether or not the engine rotational speed N is lower than the engage rotational speed N1 (step S161). When the engine rotational speed N is lower than the engage rotational speed N1 (YES in step S161), the vehicle body inclination amount estimation circuitry 59 estimates the estimated inclination amount $S_{ACL}$ of the vehicle body based on the angular acceleration $A_{ANG}$ of the vehicle body detected by the gyro sensor 70 (step S162).

When the estimated inclination amount $S_{ACL}$ is larger than the predetermined inclination amount S1 (YES in step S163), the control necessity determination circuitry 55 determines that the automatic engine brake control is "necessary", sets the control flag to 1 (step S164), and ends the processing in this subroutine. On the other hand, when the engine rotational speed N is equal to or higher than the engage rotational speed N1 (NO in step S161) or when the estimated inclination amount $S_{ACL}$ is equal to or less than the predetermined inclination amount S1 (NO in step S163), the control necessity determination circuitry 55 determines that the automatic engine brake control is "unnecessary", sets the control flag to 0 (step S165), and ends the processing in this subroutine.

That is, according to the sixth embodiment, the gyro sensor 70 that detects the angular acceleration $A_{ANG}$ of the vehicle body around the axis along the vehicle width direction is further included, and the determination condition of the control necessity determination circuitry 55 includes a condition based on the angular acceleration $A_{ANG}$ of the vehicle body detected by the gyro sensor 70.

As a result, it is possible to determine that the traveling road surface has a downhill slope based on the angular acceleration $A_{ANG}$ of the vehicle body, and thus, it is possible to appropriately determine necessity of automatic engine brake control. Specifically, when the estimated inclination amount $S_{ACL}$ based on the angular acceleration $A_{ANG}$ of the vehicle body is larger than the predetermined inclination amount S1, it can be determined that the traveling road surface has a downhill slope.

Seventh Embodiment

Figure 13:
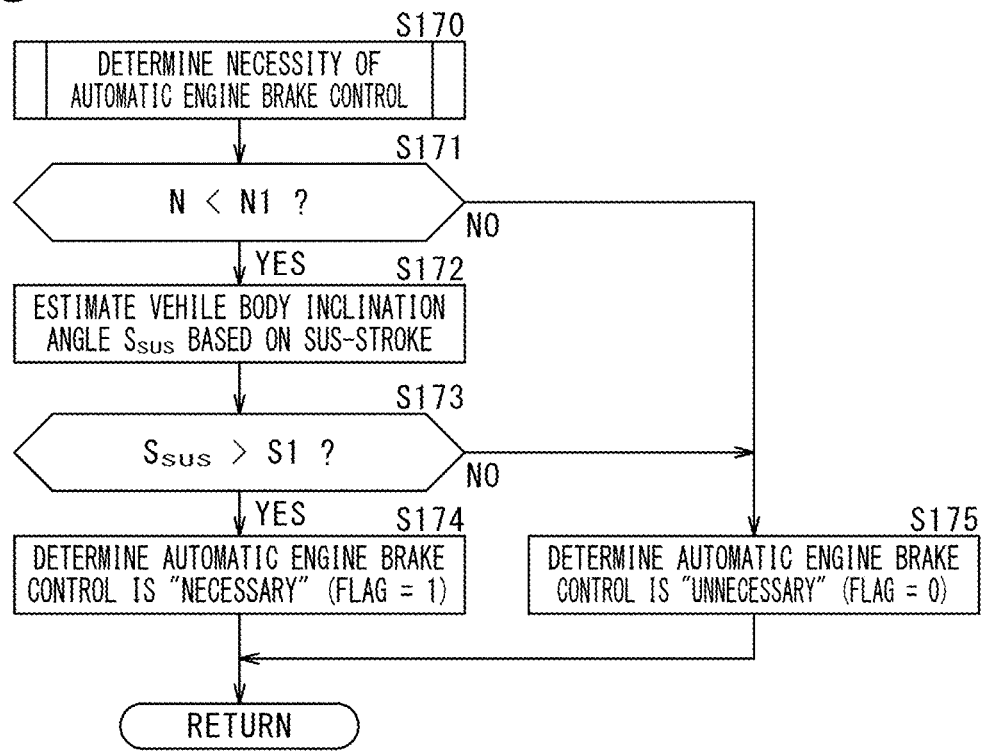
FIG. 13 is a subroutine illustrating necessity determination of automatic engine brake control according to a seventh embodiment.

FIG. 13 is a subroutine illustrating the flow of processing of necessity determination (step S170) of the automatic engine brake control according to a seventh embodiment. The seventh embodiment is different from the first embodiment in that necessity determination of automatic engine brake control is different, and first to fourth suspension stroke sensors 71 to 74 are further included as the input device 91, and the vehicle body inclination amount estimation circuitry 59 is further included in the controller 50. Description of configurations common to the first to sixth embodiments will be omitted.

As indicated by a two-dot chain line in FIG. 2, the first to fourth suspension stroke sensors 71 to 74 are provided in the right and left front wheel suspensions 14A and 14B and the right and left rear wheel suspensions 14C and 14D. The first to fourth suspension stroke sensors 71 to 74 detect the stroke amounts of the respective suspensions 14A to 14D. The vehicle body inclination amount estimation circuitry 59 estimates estimated inclination amount $S_{SUS}$ in the vertical direction toward the traveling direction of the vehicle body based on the stroke amount of each of the suspensions 14A to 14D. For example, when the stroke amounts of the front wheel suspensions 14A and 14B decrease while the stroke amounts of the rear wheel suspensions 14C and 14D increase, the estimated inclination amount $S_{SUS}$ occurs in a direction inclined downward toward the traveling direction. The estimated inclination amount $S_{SUS}$ may be, for example, an inclination angle or displacement in the vertical direction at a reference point.

As illustrated in FIG. 13, the control necessity determination circuitry 55 first determines whether or not the engine rotational speed N is lower than the engage rotational speed N1 (step S171). When the engine rotational speed N is lower than the engage rotational speed N1 (YES in step S171), the vehicle body inclination amount estimation circuitry 59 estimates the estimated inclination amount $S_{SUS}$ of the vehicle body based on the stroke amount of each of the suspensions 14A to 14D detected by the first to fourth suspension stroke sensors 71 to 74 (step S172).

When the estimated inclination amount $S_{SUS}$ is larger than the predetermined inclination amount S1 (YES in step S173), the control necessity determination circuitry 55 determines that the automatic engine brake control is "necessary", sets the control flag to 1 (step S174), and ends the processing in this subroutine. On the other hand, when the engine rotational speed N is equal to or higher than the engage rotational speed N1 (NO in step S171) or when the estimated inclination amount $S_{SUS}$ is equal to or less than the predetermined inclination amount S1 (NO in step S173), the control necessity determination circuitry 55 determines that the automatic engine brake control is "unnecessary", sets the control flag to 0 (step S175), and ends the processing in this subroutine.

That is, according to the seventh embodiment, the suspensions 14A to 14D that can extend and contract in the vertical direction of the vehicle body and that suspend the plurality of wheels, and the first to fourth suspension stroke sensors 71 to 74 that detect the expansion/contraction amounts of the suspensions 14A to 14D, respectively, are further included, and the determination condition of the control necessity determination circuitry 55 includes a condition based on the respective extension and contraction amounts of the suspensions 14A to 14D detected by the first to fourth suspension stroke sensors 71 to 74.

As a result, it is possible to determine that the traveling road surface has a downhill slope based on the respective extension and contraction amounts of the suspensions 14A to 14D, and thus, it is possible to appropriately determine necessity of automatic engine brake control. Specifically, when the right and left front wheel suspensions 14A and 14B are contracted while the right and left rear wheel suspensions 14C and 14D are extended as compared with the flat ground state, it can be determined that the traveling road surface has a downhill slope.

Various automatic engine brake control necessity determinations described in the first to seventh embodiments may be appropriately combined.

In the above embodiments, the case where the clutch Z is configured in the drive pulley assembly 32 of the V-belt type continuously variable transmission 30 in the power transmission path D has been described as an example, but the present invention is not limited to this. The clutch is only required to be that disconnect the power transmission when the engine rotational speed is lower than the engage rotational speed and to connect the power transmission when the engine rotational speed is higher than the engage rotational speed in the power transmission path D. For example, a centrifugal clutch may be provided between the drive shaft 31 and the crankshaft 21.

Figure 14:
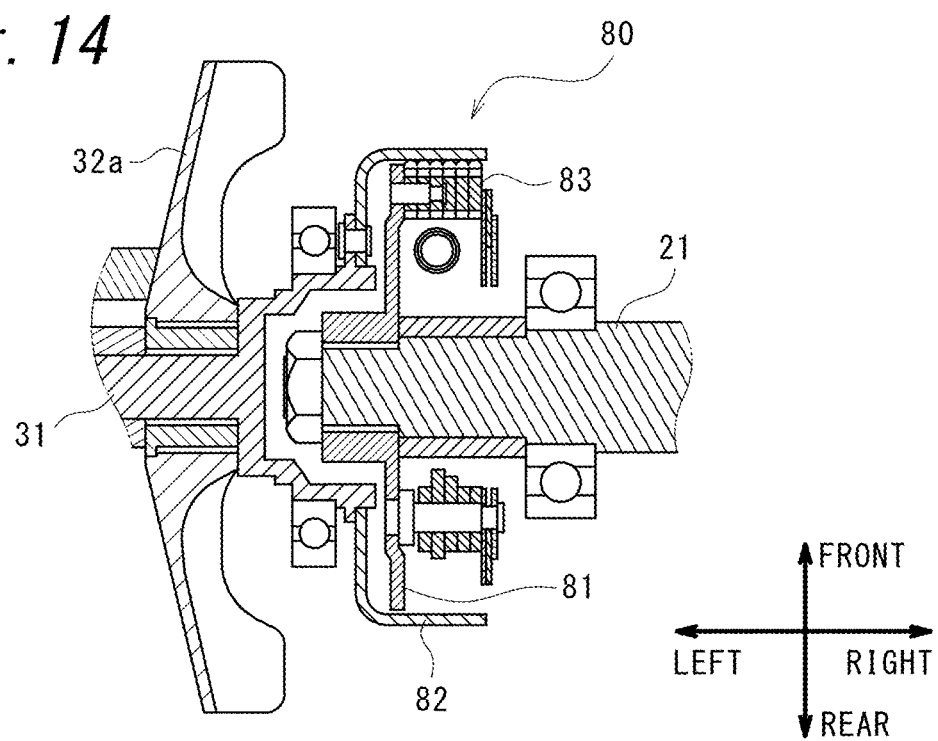
FIG. 14 is a cross-sectional view of a main part of a power transmission path schematically illustrating a clutch according to a modification.

FIG. 14 illustrates a centrifugal clutch 80 according to a modification. As illustrated in FIG. 14, the centrifugal clutch 80 is provided between the drive shaft 31 and the crankshaft 21. The centrifugal clutch 80 includes an inner drum 81 fixed to a left end of the crankshaft 21, an outer drum 82 fixed to a right end of the drive shaft 31, and an inner weight 83 provided on the inner drum 81.

As the rotational speed of the inner drum 81 increases, the inner weight 83 expands in the radial direction of the inner drum 81 by the centrifugal force and comes into pressure contact with an inner peripheral surface of the outer drum 82. A friction engagement shoe is provided on an outer peripheral surface of the inner weight 83, and the inner drum 81 and the outer drum 82 are connected by bringing the inner weight 83 into pressure contact with the outer drum 82.

Therefore, the centrifugal clutch 80 disconnects the power transmission between the crankshaft 21 and the drive shaft 31 when the engine rotational speed N is low, connects between the crankshaft 21 and the drive shaft 31 when the engine rotational speed N increases to equal to or higher than the engage rotational speed N1, and configures the power transmission between them. Therefore, even if the centrifugal clutch 80 is used, when the control necessity determination circuitry 55 determines that the automatic engine brake control is "necessary", the engine rotational speed control circuitry 56 controls the engine rotational speed N to become equal to or higher than the engage rotational speed N1, whereby the automatic engine brake control can be performed.

In the above embodiments, the utility vehicle has been described as an example, but the present invention can also be applied to a side-by-side vehicle and an all terrain vehicle (ATV).

Various modifications and changes can be made without departing from the scope of the present disclosure.

What is claimed is:

1. A utility vehicle comprising:
an engine;
a drive wheel that is configured to be rotationally driven by a drive force output from the engine;
a power transmission path between the engine and the drive wheel;
a clutch that is provided in the power transmission path and configured to disconnect power transmission when an engine rotational speed is lower than an engage rotational speed;
an engine rotational speed sensor that is configured to sense the engine rotational speed; and
a controller that is configured to control an operation of the engine,
wherein the controller includes:
an engine brake necessity determination circuitry that is configured to determine necessity of engine braking; and
an engine rotational speed control circuitry that is configured to control the engine rotational speed, and
wherein, when the engine brake necessity determination circuitry determines that engine braking is necessary, the engine rotational speed control circuitry is configured to perform automatic engine brake control in which the engine rotational speed is increased so as to be equal to or higher than the engage rotational speed, and then the clutch is connected in accordance with the increase of the engine rotational speed so that the engine brake is operated.

2. The utility vehicle according to claim 1, further comprising a vehicle speed sensor that is configured to detect a vehicle speed,
wherein a determination condition of the engine brake necessity determination circuitry includes a condition of determining that the engine rotational speed is lower than the engage rotational speed as well as that the vehicle speed is increasing or equal to or higher than a predetermined vehicle speed.

3. The utility vehicle according to claim 1, further comprising an inclination sensor that is configured to detect an inclination amount of a vehicle body,
wherein a determination condition of the engine brake necessity determination circuitry includes a condition that the inclination amount of the vehicle body is equal to or more than a predetermined inclination amount.

4. The utility vehicle according to claim 1, further comprising:
a shift operator that can switch between a forward low-speed stage, in which a gear ratio in the power transmission path is set to a low-speed gear ratio, and a forward high-speed stage, in which the gear ratio is set to a high-speed gear ratio smaller than the low-speed gear ratio; and
a variable transmission stage detection sensor that is configured to detect a variable transmission stage set by the shift operator,
wherein the controller is configured to perform the automatic engine brake control when the variable transmission stage is the forward low-speed stage.

5. The utility vehicle according to claim 1, further comprising a vehicle speed sensor that is configured to detect a vehicle speed,
wherein the controller is configured to perform the automatic engine brake control when the vehicle speed is equal to or higher than 3 miles per hour.

6. The utility vehicle according to claim 1, further comprising a gyro sensor that is configured to detect angular acceleration of a vehicle body around an axis along a vehicle width direction,
a determination condition of the engine brake necessity determination circuitry includes a condition based on the angular acceleration of the vehicle body.

7. The utility vehicle according to claim 1, further comprising:
plural suspensions that can extend and contract in a vertical direction of a vehicle body and that suspend plural wheels; and
plural suspension stroke sensors that are configured to detect respective extension and contraction amounts of the plural pensions,
wherein a determination condition of the engine brake necessity determination circuitry includes a condition based on the respective extension and contraction amounts of the plural suspensions.

8. The utility vehicle according to claim 1, further comprising an acceleration operation sensor that is configured to detect an operation of an acceleration operator by a driver,
wherein the controller is configured to end the automatic engine brake control when the acceleration operation by the driver is detected by the acceleration operation sensor.

9. The utility vehicle according to claim 1, wherein:
the engine includes a throttle valve; and
the controller is further configured to electronically control opening of the throttle valve.

10. The utility vehicle according to claim 1, further comprising a notifier that is configured to notify that that the automatic engine brake control is being performed.

11. The utility vehicle according to claim 1, further comprising a changeover switch that is configured to selectively switch between enablement and disablement of the automatic engine brake control.

12. The utility vehicle according to claim 7, wherein the plural wheels include the drive wheel.

13. A utility vehicle comprising:
an engine;
a drive wheel that is configured to be rotationally driven by a drive force output from the engine;
a power transmission path between the engine and the drive wheel;
a clutch that is provided in the power transmission path and configured to disconnect power transmission when an engine rotational speed is lower than an engage rotational speed;
an engine rotational speed sensor that is configured to sense the engine rotational speed;
a controller that is configured to control an operation of the engine;
an engine torque sensor that is configured to detect a magnitude of engine torque output from the engine; and
a drive wheel side torque sensor that is configured to detect a magnitude of drive wheel torque transmitted to the drive wheel,
wherein the controller includes:
an engine brake necessity determination circuitry that is configured to determine necessity of engine braking; and
an engine rotational speed control circuitry that is configured to control the engine rotational speed, and
wherein:
when the engine brake necessity determination circuitry determines that engine braking is necessary, the engine rotational speed control circuitry is configured to perform automatic engine brake control in which the engine rotational speed is increased so as to be equal to or higher than the engage rotational speed; and
a determination condition of the engine brake necessity determination circuitry includes a condition that an engine transmission torque, which is transmitted to the engine and calculated based on the magnitude of drive wheel torque detected by the drive wheel side torque sensor, is larger than the magnitude of engine torque detected by the engine torque sensor.

14. A utility vehicle comprising:
an engine;
a drive wheel that is configured to be rotationally driven by a drive force output from the engine;
a power transmission path between the engine and the drive wheel;
a clutch that is provided in the power transmission path and configured to disconnect power transmission when an engine rotational speed is lower than an engage rotational speed;
an engine rotational speed sensor that is configured to sense the engine rotational speed;
a controller that is configured to control an operation of the engine;
an acceleration sensor that is configured to sense acceleration; and
a brake operation sensor that is configured to detect an operation amount of a brake operation by a driver for braking the drive wheel,
wherein the controller includes:
an engine brake necessity determination circuitry that is configured to determine necessity of engine braking; and
an engine rotational speed control circuitry that is configured to control the engine rotational speed, and
wherein:
when the engine brake necessity determination circuitry determines that engine braking is necessary, the engine rotational speed control circuitry is configured to perform automatic engine brake control in which the engine rotational speed is increased so as to be equal to or higher than the engage rotational speed, and
a determination condition of the engine brake necessity determination circuitry includes a condition indicating a relationship between the operation amount of the brake operation by the driver and the acceleration.

* * * * *